(12) United States Patent
Herzig

(10) Patent No.: US 7,228,394 B1
(45) Date of Patent: Jun. 5, 2007

(54) COMPUTER DATA BACKUP STORAGE DEVICE

(76) Inventor: Joseph Herzig, P.O. Box 306, Pasadena, CA (US) 91102

( * ) Notice: Subject to any disclaimer, the term of this patent is extended or adjusted under 35 U.S.C. 154(b) by 73 days.

(21) Appl. No.: 10/374,621

(22) Filed: Feb. 25, 2003

Related U.S. Application Data

(60) Provisional application No. 60/360,094, filed on Feb. 25, 2002.

(51) Int. Cl.
*G06F 12/16* (2006.01)

(52) U.S. Cl. .............................. 711/162; 714/5; 711/114

(58) Field of Classification Search ................ 711/114, 711/162
See application file for complete search history.

(56) References Cited

U.S. PATENT DOCUMENTS

| | | | | |
|---|---|---|---|---|
| 5,297,258 | A * | 3/1994 | Hale et al. ................... | 711/114 |
| 5,594,900 | A * | 1/1997 | Cohn et al. ................... | 707/202 |
| 6,188,571 | B1 * | 2/2001 | Roganti et al. ............. | 361/685 |
| 2002/0101711 | A1* | 8/2002 | Gold .......................... | 361/685 |
| 2002/0120812 | A1* | 8/2002 | Ageishi et al. ............. | 711/114 |

OTHER PUBLICATIONS

"CRU MiniRAID IDE Mirroring Solutions User Manual", Connector Resources Unlimited, Inc. 1998.*
Cremax "Soho Raid SR2000 IDE Raid 1 Solution", Cremax USA, 1999 [retrieved on Jun. 22, 2005] Retrieved from the Internet: <url: http://web.archive.org/web/20001208000400/www.cremax.com/20.htm>.*

* cited by examiner

*Primary Examiner*—B. James Peikari
(74) *Attorney, Agent, or Firm*—Kleinberg & Lerner, LLP; Marvin H. Kleinberg

(57) ABSTRACT

A secondary storage device for a digital computer includes a housing, an attachment means coupled to an outside surface of the housing for allowing said housing to be easily attached to the computer system, a primary disk drive disposed within said housing, at least one back-up disk drive disposed within the housing, mirror circuitry disposed within the housing, and coupled to the primary disk drive, and the at least one back-up disk drive, bus connection means coupled to the mirror circuitry for connecting said secondary storage device to a main bus of the digital computer, and timing means coupled between the mirror circuitry and one of the back-up disk drives for creating mirror back-up images of the primary disk drive at predetermined intervals.

7 Claims, 12 Drawing Sheets

COMPUTER DATA BACKUP STORAGE DEVICE

This is a continuation-in-part of a co-pending application Ser. No. 60/360,094, filed Feb. 25, 2002.

BACKGROUND

I. Field of the Invention

The present invention relates to digital computers and, more particularly, to secondary data storage devices which are useful with digital computers.

A secondary storage device stores computer program code and or data even when the computer's power is turned off. Such behavior makes secondary storage devices so-called nonvolatile storage. Secondary storage devices usually also have a much larger data storage capacity than primary storage devices.

Primary storage devices are the computer's main memory, known as random access memory or RAM. Since the data they contain usually vanishes when the computer's power is turned off, primary storage is described as volatile storage.

Common secondary storage devices include magnetic hard disk drives. There are many different manufacturers of disk drives. For example, the IBM® Deskstar® series are popular magnetic hard disk drives sold as of this writing. See the IBM® Internet web site http://www.ibm.com/harddrive for more information. Seagate® Technology of Scotts Valley, Calif. makes the popular "U Series" line of magnetic disk drives. Seagate's phone number is 800-seagate, and their Internet web site is at http://www.seagate.com/products/discsales. Western Digital® Corporation of Lake Forrest, Calif. makes a popular line of magnetic hard disk drives called the "Caviar®" series. Western Digital's® phone number is 949-672-7000, and they have Internet web site at http://www.westerndigital.com/products/productcatalog.asp.

Common secondary storage device interfaces in use today include the IDE and SCSI interfaces. The Integrated Drive Electronics (IDE) interface comes in three types:

the IDE XT, the IDE AT (also known as the IDE ATA type interface) and IDE MCA type interfaces. The Enhanced Integrated Drive Electronics (EIDE) interface is often used for magnetic hard disk drives and CD ROM drives in home desktop personal computers. The SCSI secondary storage device interface is the Small Computer System Interface and comes in three types: the SCSI-1 interface, SCSI-2 and SCSI-3 type interfaces.

II. Prior Art

Available prior art devices include the Redundant Array of Inexpensive Disks (or RAID), the "Mobile Rack" which is a removable mounting rack for magnetic hard disk drives shown in U.S. Pat. Nos. 5,767,445 and 5,797,667, an external backup hard drive which can connect to the computer through a port or through a Universal Serial Bus (USB®) connection and a cable based hard drive mounting bracket backup kit. The concepts of RAID were extensively discussed and explained in an article published in 1988 by ACM at pages 106–116, authored by David A. Patterson, Garth Gibson and Randy H. Katz.

Although RAID devices can be configured in a MIRROR mode, the actual implementation generally requires skills beyond those of the average computer user. Many ways of using a RAID device require several magnetic hard drives but one configuration, known as a MIRROR, (also known as RAID MODE 1) requires only two. It is salient to note that the second drive has the same information as the first and is not merely a listing or compilation of the data on the first drive.

For example, if the mirrored drive is one from which the system can be started, sometimes know as a boot drive, then the mirrored drive which the RAID device creates is also usable as a boot drive. In this mode of usage, the RAID device maintains the data on the second hard drive as an identical configuration of the first.

RAID devices can also include those manufactured in the form of peripheral cards (PCMCIA cards), RAID motherboards, and external RAID devices. RAID peripheral cards are auxiliary products which are inserted into special machine ports, generally found on lap top devices. External RAID devices, which are stand alone units outside of the computer case, are connected to it via a cable of some kind. RAID motherboards have RAID circuitry embedded in them.

Both the RAID device configured in a mirror mode and the device of the present invention, hereinafter referred to as the "safety cartridge," protect against failure of the secondary storage device, most likely a magnetic hard disk drive. In the preferred embodiment, the safety cartridge includes two, substantially identical magnetic disk drives and drive circuitry for simultaneous parallel operations on both disks. One of the disks may be considered the main memory and the other, the back up or check disk.

SUMMARY OF THE INVENTION

Here are some of the advantages of the safety cartridge of the present invention over RAID devices envisaged in the prior art:

Unlike most RAID cards and external RAID devices sold today, the safety cartridge is an integral unit comprising at least two magnetic disk drives and control circuitry configured so that it can be easily installed and used by a layperson. In contrast, RAID devices generally tend to be used by network operators and personnel with network related certifications.

The safety cartridge is a container with an interface jack on one side, and is simple to use. Because the safety cartridge would use existing popular secondary storage device interfaces (like IDE or SCSI), it would require few decisions to be made by the user, and little or no work on proper configuration.

1. Ease of portability:

Unlike RAID motherboards and RAID cards, the safety cartridge once installed by a manufacturer or by the user is easily removable from the computer unit by a layperson should the user choose to do so. One would remove main memory because a computer failed or because the user wants to upgrade to a more powerful computer. In many cases, such interchangeability would require few or no configuration changes for the software on the disk. If the safety cartridge were the main "bootable" hard drive for the computer, configuration changes for the computer's operating system (often Microsoft Windows® for a layperson's computer) would be needed in some cases.

If the safety cartridge were used as an extra storage device, and not as the main "boot drive", the switch between computers would require no reconfiguration in all but a few cases. This is in contradistinction to a RAID card or motherboard, which, as a component, is difficult to remove for most computer laypersons and may require configuration changes in order to switch to a different computer.

2. Simplicity and Appeal:

It seems probable that the safety cartridge protects against hard drive failure in a way which is easy enough to use and maintain such that a greater number of computer laypersons are more likely to use the safety cartridge than a RAID device.

As a specific example, Cremax® (of Placentia, Calif., USA) either now sells, or sold sometime in the last five years, an external RAID device with two hard magnetic hard drives mounted in it, called the "The Cremax® Soho RAID SR3000 1394 Hard Drive Case". It is connected to a computer via an interface known as "1394" or the "fire wire". It is also manufactured in another version using an interface known as "USB2®" (Universal Serial Bus) to connect to a computer.

In the preferred embodiment, the safety cartridge is different because it is installed in the computer case and is removable. It is arguably more suited to use by computer laypersons due to its general ease of use, including lack of clutter and bulkiness. Unlike the "Cremax® Soho Raid" devices, it does not need a separate power supply.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE INVENTION

Figure 1:
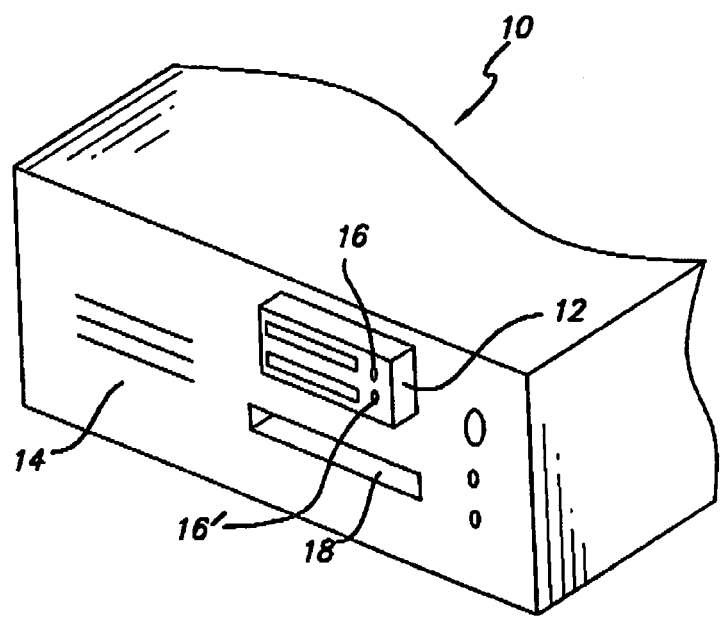
FIG. 1 is partially broken away perspective of a computer device front panel in which a preferred embodiment of the present invention is installed.

A secondary storage device for a digital computer system is described. In the following description, various structural details, manufacturing methods and materials will be set forth in order to give a more thorough understanding of the present invention. It will be apparent to those of skill in the art that the present invention may be practiced without these specific details. In other instances, well known processes and structures are not specifically described so as not to obscure the present invention unnecessarily.

The safety cartridge in the preferred embodiment, is a device, primarily aimed at computer laypersons, to help protect against data loss on computer secondary storage devices, and:

1. It has two or more secondary storage devices mounted in a case which are connected by "mirror" circuitry, which copies an exact image of one secondary storage device onto the other(s).

2. It uses standard secondary storage device interfaces. It may have an interface to a power supply also, but this can be omitted in cases where the power for the secondary storage devices is supplied through the standard secondary storage device interface.

3. It is installed in the computer case or chassis in a manner which enables it to be easily removed.

For many years, RAID arrays operating in "mirror" mode have been available as a real time defense against secondary storage device failure to the computer savvy and those willing to put in the extra effort to configure them. The "Computer Data Backup Storage Device" may make such valuable protection available to many computer laypersons with a minimum of technical savvy or effort at configuration needed.

Several embodiments of the safety cartridge are described below. The preferred embodiment of my inventions consists of two secondary re-writeable data storage devices mounted in a removable case and connected with circuitry so that one contains exactly the same data, in the same configuration, as the other one. One secondary storage device is to be connected to the computer as its primary, non-volatile, large scale memory, and the other is connected to circuits which write an exact copy of the data on the first one to the second one. In case the primary memory device fails, the backup secondary storage device can serve as a substitute.

By this method one of the storage devices can serve as a backup for the other one in case of failure. Furthermore this backup would be updated instantly (very quickly or in so-called "real time").

In the preferred embodiment, two "half-high" hard disk drives are mounted in an enclosure which can fit inside a "full high" hard disk drive bay, connected by "mirror" circuitry with a power jack and an IDE jack in the rear. The enclosure is removable and has connectors which mate to connectors within the disk drive bay, through which power and signals are supplied to the disk drives.

Anyone who has ever lost valuable data on their personal computer when a magnetic hard disk drive failed will appreciate the usefulness of this idea, which does not require the computer operator to make periodic back up copies of data on their personal computer's secondary storage device in order to provide a level of redundancy for data storage. Further, there is no need for separate back-up media, such as tape or CD-R or CD-RW devices.

There are several alternative embodiments described below. They deal with possible variations in the safety cartridge in the following areas:

Real time mirroring" versus a combination of "Real time and delayed mirroring"

"Manual switch to backup" versus "automatic switch to backup"

Transparent to computer's operating software or not with respect to both "booting up" and "real time mirroring".

Fixedly Mounted in a bay in the standard computer chassis or case.

Any size versus "Desktop PC size" versus "Laptop PC size".

Removable side panels on the safety cartridge so the user can replace a failed secondary storage device easily versus no removable panels.

With mirror circuitry inside the safety cartridge versus elsewhere.

With or without a "failure indicator" which is mounted on the outside of the safety cartridge for each secondary storage device and which is visible to the user.

Safety Cartridge Embodiments with Both Real Time and Delayed Mirroring

Two alternative embodiments of the safety cartridge featuring a degree of protection against operator error and data corruption, in addition to protection against failure of the secondary storage device, are described below. Note that in the case of each periodically made mirror image, said image can be made available either as an extra secondary storage device which the user can access via the computer's operating system (which could be an extra "drive letter" in the operating system known as Microsoft Windows®), or be available via a switch.

i.) Real and "Cumulative Periodic" Mirroring:

This method of making the safety cartridge would use three secondary storage devices instead of two:

One main secondary storage device, for regular usage as the main memory.

Two mirror drives, one with an image made in real time and another with an image made at fixed intervals of cumulative hours to be set by the manufacturer, most likely 24 cumulative hours of actual usage, whether continuous or not. This method will require a battery to be placed in the safety cartridge.

ii.) Real and "Calendar Periodic" Mirroring:

This alternative method of making the safety cartridge would also use three secondary storage devices instead of two:

One main secondary storage device, for regular usage.

Two mirror drives, one with an image made in "real time" and another with an image made at fixed calendar events determined by the computer's internal clock. This second mirror drive image would most likely be made when the computer first boots up on an odd numbered day of the month, but it could be made at any time interval specified by a logical function of the computer's calendar and clock.

iii.) Real Time Mirroring with More than One Delayed Image Included:

One adds additional secondary storage devices to the safety cartridge to have more than one delayed mirror images of the main secondary storage device available, in addition to one real time mirror image. One could use either "cumulative periodic" or "calendar periodic" mirroring and have more than one time delay interval present. For example, one could have a total of four secondary storage devices inside a safety cartridge:

Where one is the main secondary storage device;

Another is a real time mirror image of the main device;

A third secondary storage device is a two day delayed mirror image; and

A fourth secondary storage device is a week delayed mirror image.

To understand the benefits of this alternative, imagine that one accidentally deleted an essay upon which one had been working for three weeks, and had no plain paper printout of it. It would be most rewarding to be able to go back a day or so and recover the lost work product. It is now possible using the safety cartridge. Because the mirror circuitry of this alternative embodiment made a fixed image a day or so ago, one could to it and get access to recently erased files although the interim work product might be lost.

Alternative Switching Embodiments

A). Automatic Switch to Backup:

In this embodiment, the safety cartridge would switch to backup automatically in case the main secondary storage device failed.

B). Manual Switch to Backup:

The safety cartridge can be made with a user operated switch on the front of it to switch to the real time or delayed mirror drives. The delayed mirroring embodiments could have the delayed mirror images available as additional secondary storage devices always accessible to the user for some types of secondary storage device interface (such as IDE). Or, the delayed mirror images could be accessible via a front mounted user switch for other types of secondary storage device interface where continuous access may not be possible.

Alternative Embodiments with Respect to Computer Operating System:

A). With or without boot transparency—

If the safety cartridge does not require any special modifications (known as "installed drivers" in some cases) to be made to the computer operating system for it to boot, then it is transparent with respect to the operating system for purposes of booting or "boot transparent." A boot transparent safety cartridge would function with any feasible operating system installed on the computer. For example, when switching from Windows 98 to Windows 2000, no special modifications on account of a boot transparent safety cartridge would have to be made.

If special computer operating system modifications which are a function of the design of the safety cartridge must be made in order for the computer to boot properly, then the safety cartridge is not boot transparent. For example, a so-called plug and play operating system would not have to reconfigure itself for a boot transparent safety cartridge but might have to for a safety cartridge which was not boot transparent. In a boot transparent safety cartridge the computer's operating system need only be configured to deal with the usual interface between the computer and the secondary storage device. As of this writing, a RAID device with boot transparency has not been tested. However, it is believed that it would be possible to use existing technology and engineering techniques to design and build a boot transparent RAID device for some, if not all, popular interfaces for computer secondary storage devices.

B.) With or without mirror transparency—

If the safety cartridge does not require any special modifications (known as "installed services" in some cases) to be made to the computer operating system for it to create a mirror image of the secondary storage device (both in real time or at timed intervals), then it is transparent with respect to the operating system for purposes of creating a mirror image or "mirror transparent." If special computer software which is a function of the design of the safety cartridge must be installed in order for the safety cartridge to create a mirror image of the secondary storage device, then the safety cartridge is not mirror transparent. For example, a so-called Windows service or Device Manager Software would not have to be installed into the computer's operating system for a boot transparent safety cartridge to operate. However, special mirroring software might have to be installed for a safety cartridge which was not mirror transparent to create a mirror image of the secondary storage device.

Alternative Embodiments with Respect to Mounting Hardware

The safety cartridge can be mounted in a removable bay or directly mounted into a computer.

A). Removable Bay Mount:

In this embodiment, the safety cartridge is encased inside a removable bay designed to slide out easily from a fixed dock which provides connections to the computer circuits. This allows easy removal and allows a user to use more than one safety cartridge with a computer. It also allows easy switching between computers with one safety cartridge, provided that both machines have the dock of the removable bay installed. This embodiment could have a handle on the safety cartridge for easy removal.

B). Direct Mount:

In this embodiment, the safety cartridge is enclosed in a case which is mounted directly to a computer's chassis with mounting screws or other mounting hardware that is standard for that particular chassis. Note that this safety cartridge is indeed very removable, however, the computer case or chassis cover must be removed first to release the standard mounting hardware.

Alternative Embodiments with Respect to Size

The safety cartridge could be a removable or detachable container of any size attached to a computer and containing two or more distinct secondary storage devices connected by mirroring circuitry. However, two sizes apposite to today's computers are:

1. Desktop Personal Computer size: 8.4 inches deep, 5.8 inches wide and 1.5 inches high.

2. Laptop Computer size: 4 7/16 inches deep, 2 13/16 inches wide, 13/16 inches high. Note that the laptop computer size safety cartridge can be implemented with flash RAM cards.

3. Other sizes: There are other popular sizes of magnetic hard disk drive mounts, especially for laptop machines, which are in use today. A safety cartridge could be manufactured for almost all, if not all, of them.

Alternative Embodiments with Respect to Ease of Secondary Storage Component Replacement A safety cartridge with removable covers (most likely on the top and bottom) would facilitate easy user replacement of the secondary storage devices contained in the safety cartridge.

In this embodiment, the safety cartridge would have removable panels to allow the user to swap out a failed secondary storage device (i.e. a magnetic hard disk drive).

Alternative Embodiments with Respect to Mounting Placement

A.) Flush Chassis Mount:

In this embodiment the safety cartridge would be mounted inside the computer chassis or case, with one surface exposed to the outside, so it can be easily removed.

B.) Outside Chassis Mount:

In this embodiment, the safety cartridge would be mounted on the outside of the computer chassis or case, for very quick and easy removal. Only a minimal surface would be adjacent to the computer chassis or case, as needed for power and secondary storage device interface connections. Such ease of removal might be of use to certain types of computer users who have a constant need to switch between large portfolios of digital data, like those who prepare animation.

Alternative Embodiment with Respect to Mirror Circuitry Placement

A.) Mirror Circuits Inside Cartridge:

In this embodiment, the mirror circuits are inside the safety cartridge case with the secondary storage devices.

B.) Mirror Circuitry Outside Cartridge:

In this embodiment the mirror circuits are outside the safety cartridge case. In this embodiment, the safety cartridge case contains secondary storage devices and has a secondary storage device interface jack, with a power jack, if applicable, on the mounting side. The mirror circuitry in this embodiment is mounted elsewhere inside the computer case or chassis.

If the user had the anticipation that a new machine they were going to buy had mirror circuitry which would interface with the safety cartridge the same way the mirror circuitry in their current machine does, the safety cartridge would still be easily portable from machine to machine. If the user did not have the expectation of mirroring circuitry being present which used exactly the same interface in a new computer, then the situation would be different. The case containing two secondary storage devices but no mirroring circuitry would no longer be easily portable from machine to machine by most computer laypersons.

Alternative Embodiment with Respect to Failure Indicators

The safety cartridge is possible with or without a failure indicator for each secondary storage device inside. The failure indicator would be mounted on the outside of the safety cartridge in a manner visible to the user, and would become active when one of the secondary storage devices failed. It could be a clearly visible red colored light emitting diode (LED), for example.

Benefits Over Mobile Rack:

A.) Built-in Failure Protection:

The mobile rack is built to contain only one hard disk drive which is generally considered an additional memory device rather than a back up. The safety cartridge includes a pair of disk drives operating in parallel within the same enclosure and provides automatic backup when operating in the RAID I mode.

B.) The safety cartridge Lends Itself to a "Keep Your Stuff"Concept:

Since it is highly unlikely, although not impossible, that two secondary storage devices will fail within a very short time period, the safety cartridge greatly increases the probability that a computer layperson, who is less likely to have adequate backup (like a RAID device configured in the Mirror mode) will be able to maintain work product over a long time period. As magnetic disk memories provide greater and greater storage capacity, the need for back up media with the same capacity creates a problem. Today, even magnetic tape backups lack the capacity to back up a high capacity disk without the use of several tape cartridges. If more than one cartridge is required for a back up operation, an operator must be present to change the tape.

With the safety cartridge containing a pair of high capacity disks, a layperson buying a new computer (either for replacement of a worn out machine or an upgrade) is more likely to be able to easily maintain their work product and transport it to the new machine. Moreover, the back up is automatic and does not require a separate operation or procedure.

Benefits Over External Backup Drive:

Universal BusLink® Corporation sells an external hard drive packaged with backup software called the "BusLink USB Portable Hard Drive". The outside of the box of the "BusLink® Portable USB Hard Drive" Model L20 has a label noting that "Retrospect Backup Software [is] Included FREE with Purchase". Universal BusLink® Corporation of Baldwin Park, Calif. maintains a website a www.buslink-.com.

The BusLink® hard drive is different from the safety cartridge in several ways, including that it is external to the computer, being connected via a universal serial bus (USB) port.

A.) The safety cartridge offers real time backup in the event of hard drive failure.

B.) The safety cartridge does not require an extra power source, whereas the "BusLink® Portable Hard Drive" requires a separate DC power adapter plugged into a 110 VAC wall outlet.

C.) If the backup is automated, the user must have the external drive connected to the USB port at the designated backup times. Backup times are designated using the "Retrospect Express" backup software which is included with the BusLink® drive. If the user forgets to plug the BusLink® drive into the USB port before the scheduled backup starts, the backup will fail.

Since the safety cartridge has both the main and backup secondary storage devices mounted inside one case, this is not an issue with the safety cartridge.

Benefits Over Cable Based Hard Drive Mounting Backup Kit:

In Close Design, Inc. sells the "Cool Connections—System Enhancement Upgrade Kit," whose box has a label stating that the package contains "FREE! Duocor® XACT-COPY™ Full Backup and Disaster Recovery Software/ $69.99 VALUE". InClose® Design, Inc. is located in San Jose, Calif. and maintains an Internet web site at http://www.inclose.com. DuoCor® is located in Nevada City, Calif. and maintains an Internet web site at http://www.duocor.com. The Cool Connections kit contains:

A.) XactCopy™ hard disk drive backup software by DuoCor®. This software has a built-in scheduling function, which allows the user to preset times for magnetic hard disk drive backup.

B.). An IDE cable by which two magnetic hard drives can be connected to a computer C.) One removable hard disk drive mounting bracket, called a "Mobile Dock."

D.) A floppy disk drive connection cable by which two floppy disk drives can be connected to a computer.

However, it appears that the Cool Connections kit does not prescribe an exact method by which magnetic hard disk drive backup is to be accomplished. One can only guess that the seller intends the buyer will use two magnetic hard disk drives with IDE interfaces (which are not included in the Cool Connections kit) and configure one as an IDE Master drive and the other as an IDE Slave drive. Such a configuration will allow both devices to be coupled to the same IDE cable. Presumably the magnetic hard drive configured as an IDE Master would be mounted as a removable device using the Mobile Dock. Then the magnetic hard drive mounted in the Mobile Dock could be backed up to the other drive configured as an IDE Slave drive using the XactCopy™ software provided in the Cool Connections kit.

This is different from the safety cartridge in because both the main and backup secondary storage device in the safety cartridge are mounted in one place, unlike the "Cool Connections" upgrade kit. The safety cartridge has several advantages over the "Cool Connections System Enhancement, Upgrade kit" as far as secondary storage device backup is concerned.

E.) Real Time Backup

First, it offers real time backup in the event of hard drive failure.

F.) Ease of Installation

The safety cartridge is easier to set up than the Cool Connections kit, because the user does not have to make any choices about IDE Master Drive versus IDE Slave Drive configurations when using the safety cartridge unlike the Cool Connections kit.

G.) Ease of Portability—

If the backup is automated, the user must have the magnetic hard drive which is to be backed up mounted in the Mobile Dock and connected to the same computer into which it was first installed, or to another computer with a second magnetic hard disk drive configured as an IDE Slave Drive, otherwise backup will fail. Since the safety cartridge has both the main and backup secondary storage devices mounted inside one case, this is not an issue with the safety cartridge. Thus, the safety cartridge offers easier portability, and requires less technical savvy on the part of the layperson user.

Figure 3:
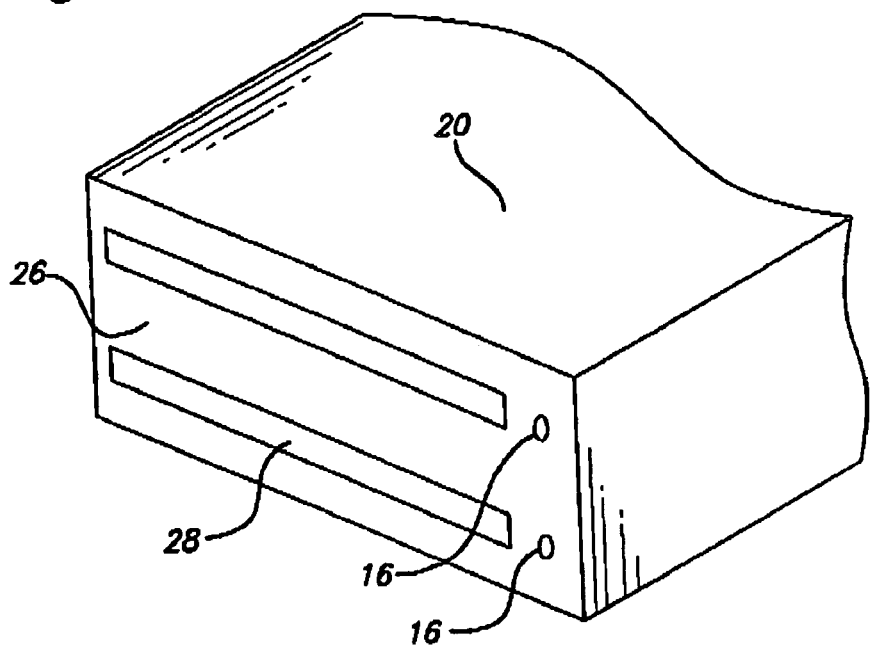
FIG. 3 is a perspective view of the module of FIG. 2 but with the front panel in place.

Turning first to FIG. 1, there is shown a desktop computer 10 with safety cartridge 12 installed and partly protruding. As with most conventional computers, a disk drive bay 14 is provided for removable storage media such a floppy disks or even Zip® disks. Failure indicators 16, 16' are located on the front panel 26 (as seen in FIG. 3) of the safety cartridge 12 to signal faults in either of the storage devices contained within the cartridge 12. In some embodiments, a pushbutton switch 18 can be used to activate the backup device in case the main one fails, but in the preferred embodiment, the switch over would be automatic.

Figure 2:
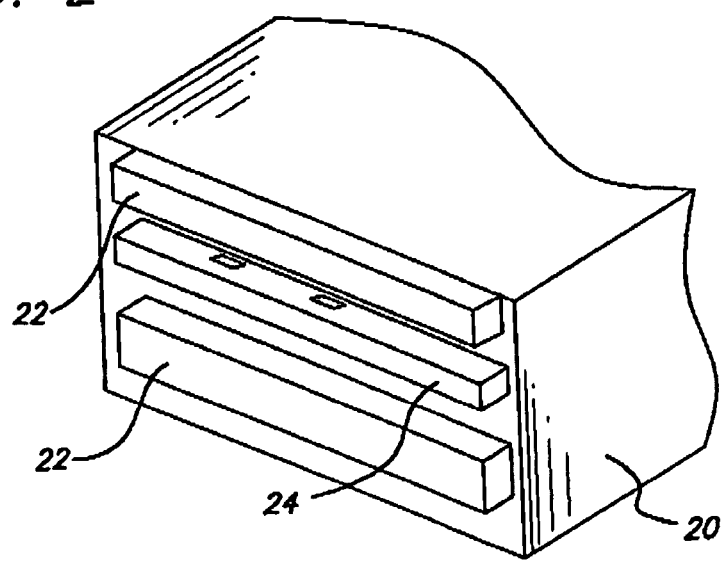
FIG. 2 is a perspective view of a removable magnetic disk module but without a front panel according to a preferred embodiment of the present invention.

Turning next to FIG. 2, there is shown, in perspective, the front of a safety cartridge 12, according to a preferred embodiment of the invention. To facilitate description, the cartridge is shown without the front panel 26 seen in FIG. 3. The safety cartridge 12 has a casing 20 that is adapted to fit into a "full height" opening on a conventional desk top computer case. A mounting frame (not shown) is mounted in the full height opening and is adapted to receive the safety cartridge 12.

Mounted within the casing 20 are a pair of magnetic disks 22, 22' which, in the preferred embodiment, are substantially identical, large capacity memory devices in the "half height" configuration. Between the disks 22, 22' is a printed circuit board 24 with all of the ancillary circuitry necessary to allow the disks to function as a RAID Mode 1 device with mirroring.

The safety cartridge 12 with the front panel 26 installed is shown in FIG. 3. As shown, vents 28 in the front panel 26 provide air circulation for each of the disk drives 22, 22' of FIG. 2. As also shown in FIG. 1, a pair of lights 16, 16' are placed on the front panel 26 seen in FIG. 3.

Figure 4:
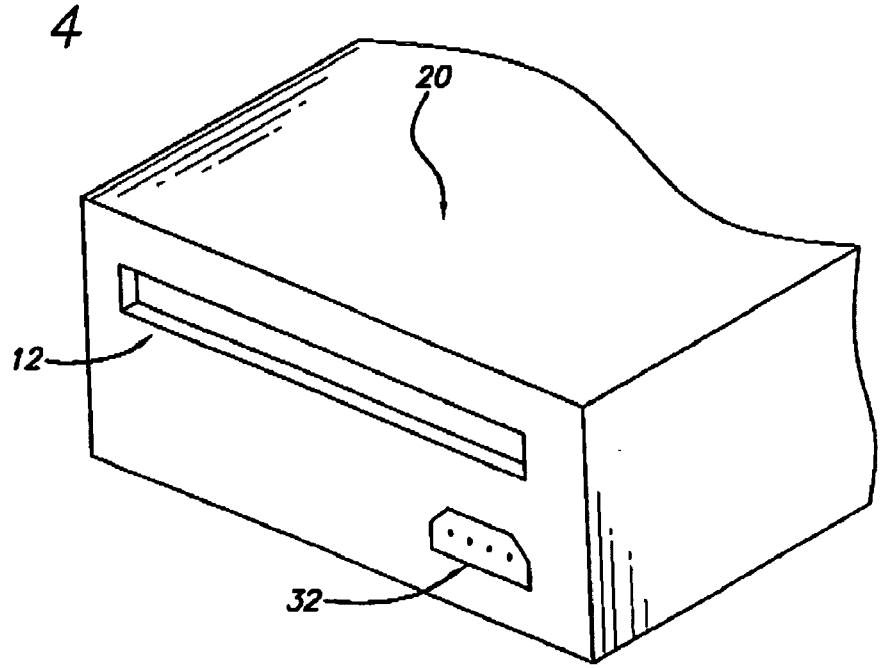
FIG. 4 is a partially broken away perspective view of the rear of the disk module of FIGS. 2 and 3.
Figure 5:
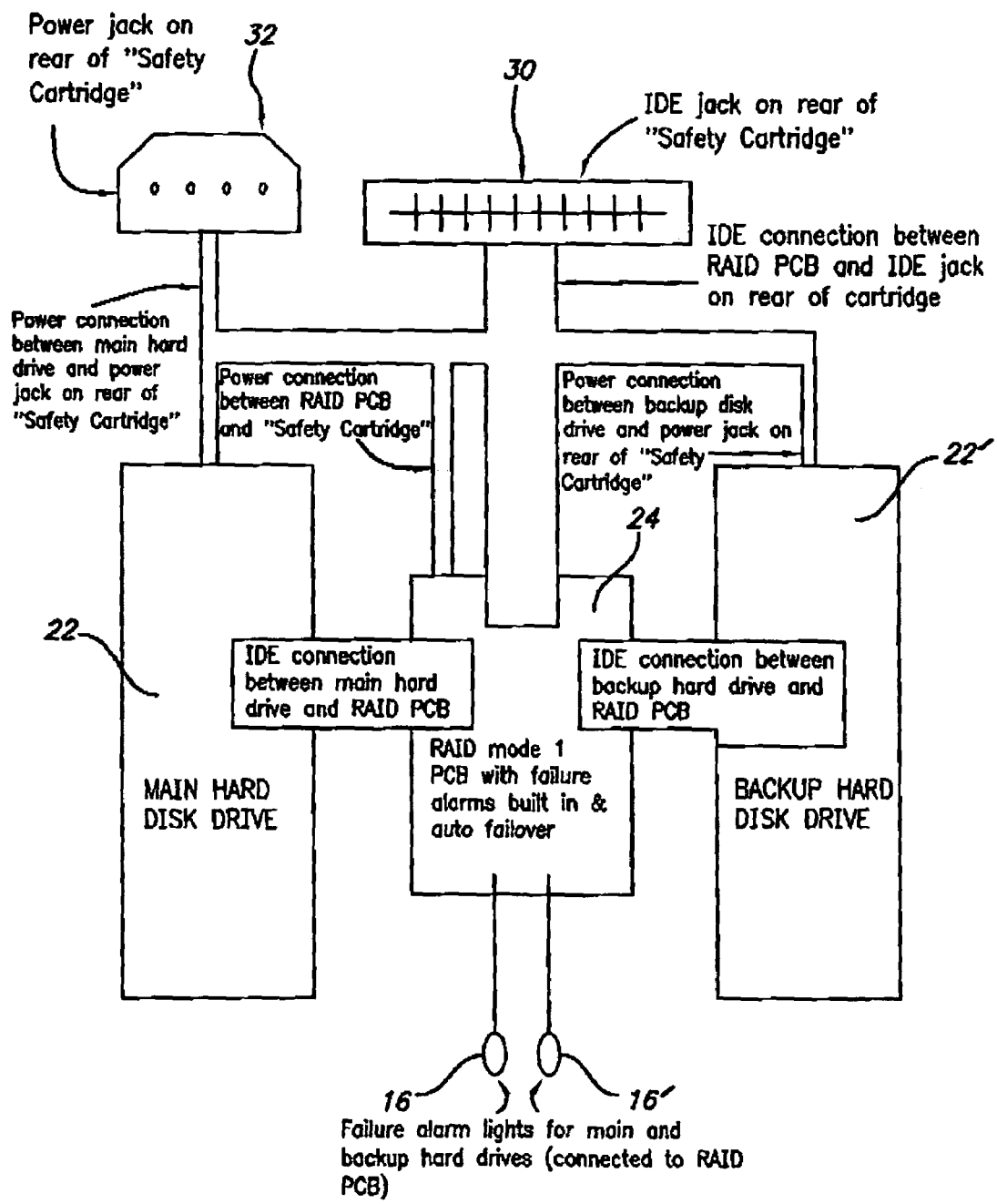
FIG. 5 is an idealized block diagram of the computer back up data storage device of the present invention.

The rear of the safety cartridge 12 is shown in FIG. 4. A socket 30 (as seen in FIG. 5) is adapted to connect to the IDE disk drive cables normally used to connect the CPU circuits to the disk drive memory circuits. A second socket 32 permits the supply of electrical power to the circuits operating the safety cartridge 12 and its various components.

In FIG. 5, there is show a schematic block diagram of the safety cartridge of the present invention according to a preferred embodiment thereof. The power socket 32 provides electrical power to both the main memory disk 22 and the back up disk 22'. The PCB card 24 includes the necessary read-write circuitry for the disks 22, 22' as well as the mirroring circuitry and the drivers for the alarm lights 16, 16'. The PCB 24 is also coupled to the IDE socket 30 that is adapted to connect to the CPU and other circuits of the computer 12. The IDE socket acts as a means for coupling the safety cartridge to the computer system's main bus. It will be apparent to those of skill in the art that different bus connection means can also be used with equal effectiveness.

Laptop Safety Cartridge

Figure 6:
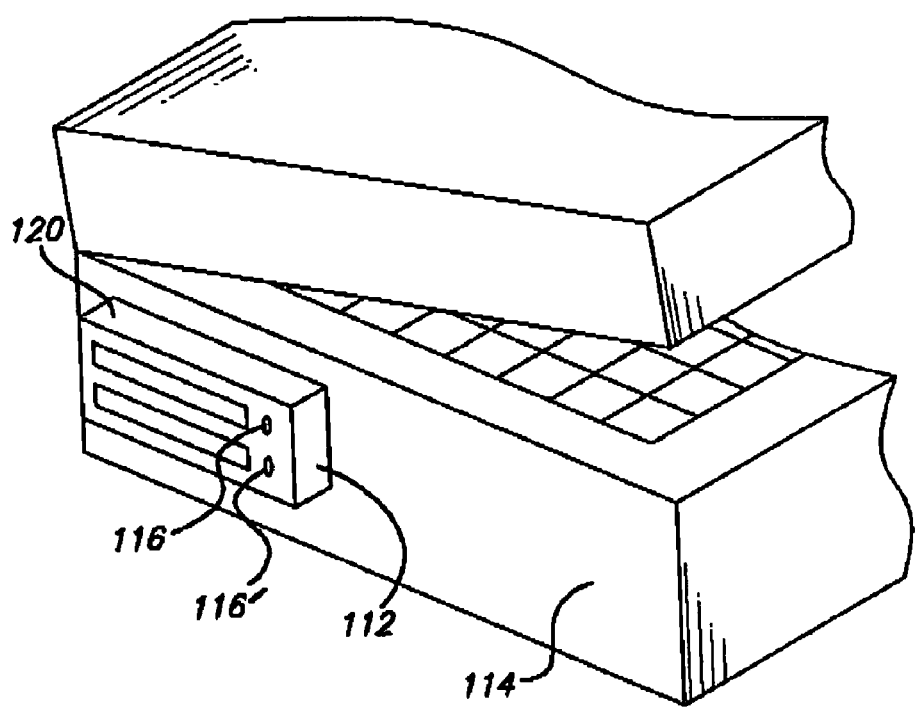
FIG. 6 is partially broken away perspective of a laptop computer device in which an alternative embodiment of the present invention is installed.

Turning next to FIG. 6, there is shown a laptop computer 110 with safety cartridge 112 installed and partly protruding. As with most laptop computers, a disk drive bay 114 is provided for a main magnetic memory module. Failure indicators 116, 116' are located on the front panel 126 of the safety cartridge 112 to signal faults in either of the storage devices contained within the cartridge 112. In some embodiments, a pushbutton switch (not shown) can be used to activate the backup device in case the main one fails, but in the illustrated alternative embodiment, the switch over would be automatic.

Figure 7:
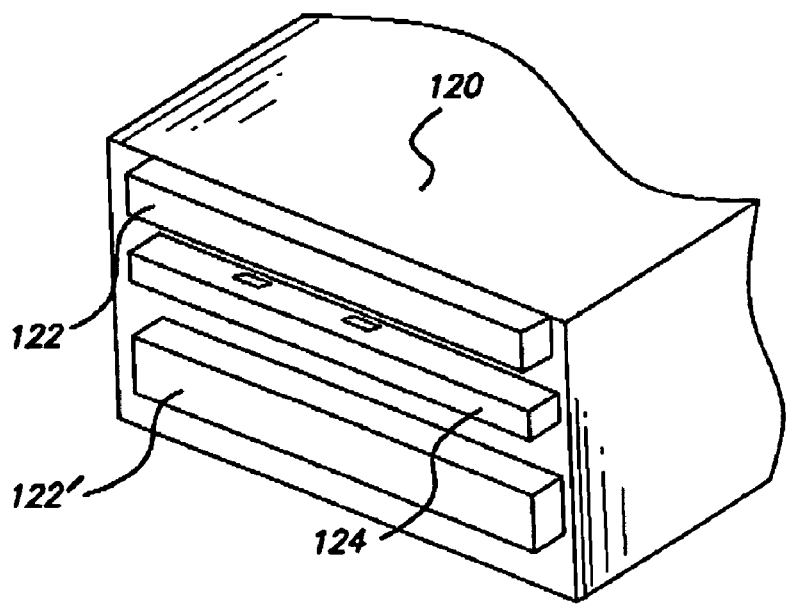
FIG. 7 is a perspective view of the removable magnetic disk module of FIG. 6 but without a front panel according to the alternative embodiment of the present invention.

In FIG. 7, there is shown, in perspective, the front of a safety cartridge 112, according to a preferred embodiment of the invention. To facilitate description, the cartridge is shown without the front panel 126 seen in FIG. 6. The safety cartridge 112 has a casing 120 that is adapted to fit into the bay normally occupied by the main magnetic memory of the laptop device. The safety cartridge 112 is designed to be compatible with and a replacement for such main magnetic memory. Mounted within the casing 120 are a pair of magnetic memory modules 122, 122' which, in the preferred embodiment, are substantially identical, large capacity memory devices in the "credit card" configuration although a PCMCIA configuration could be adapted for use with the present invention. Between the disks 122, 122' is a printed circuit board 124 with all of the ancillary circuitry necessary to allow the disks to function as a RAID Mode 1 device with mirroring.

Figure 8:
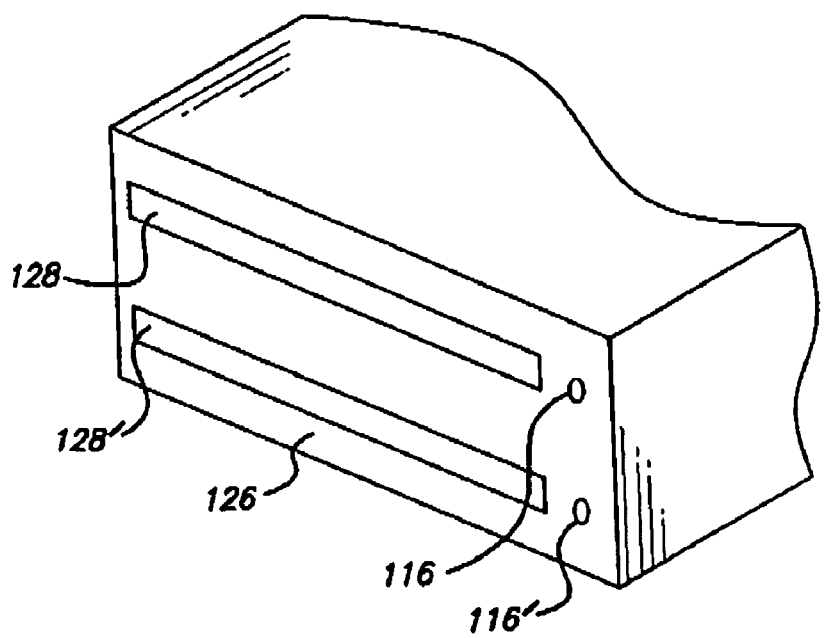
FIG. 8 is a perspective view of the module of FIG. 7 but with the front panel in place.
Figure 9:
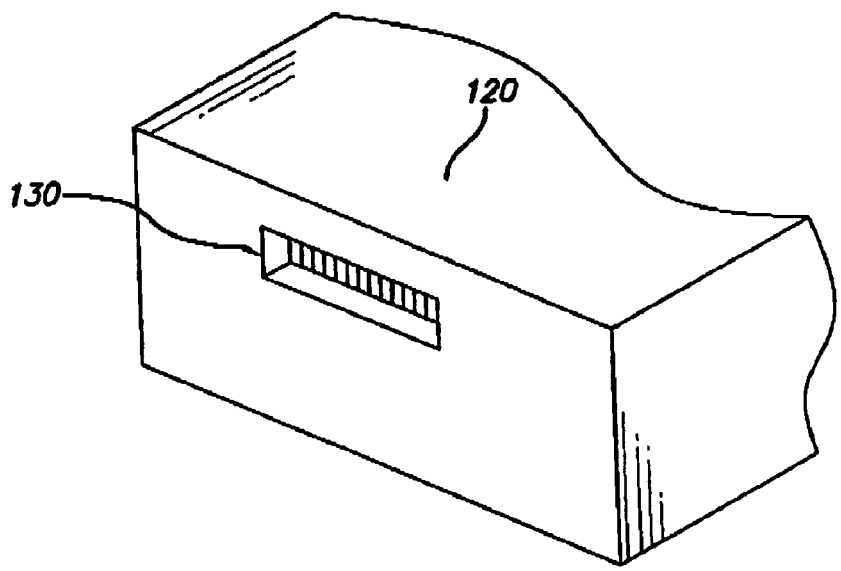
FIG. 9 is a partially broken away perspective view of the rear of the disk module of FIGS. 7 and 8.

The safety cartridge 112 with the front panel 126 installed is shown in FIG. 8. As shown, vents 128, 128' in the front panel 126 provide air circulation for each of the disk drives 122, 122' of FIG. 7. As also shown in FIG. 6, a pair of lights 116, 116' are placed on the front panel 126. The rear of the safety cartridge 112 is shown in FIG. 9. A socket 130 is adapted to connect to the ATA hard drive interface jack normally used to connect the CPU circuits to the disk drive memory circuits. The ATA socket 130 normally supplies electrical power to the circuits operating the safety cartridge 112 and its various components. In this laptop version of the safety cartridge, the ATA jack acts as the bus connection means.

Figure 10:
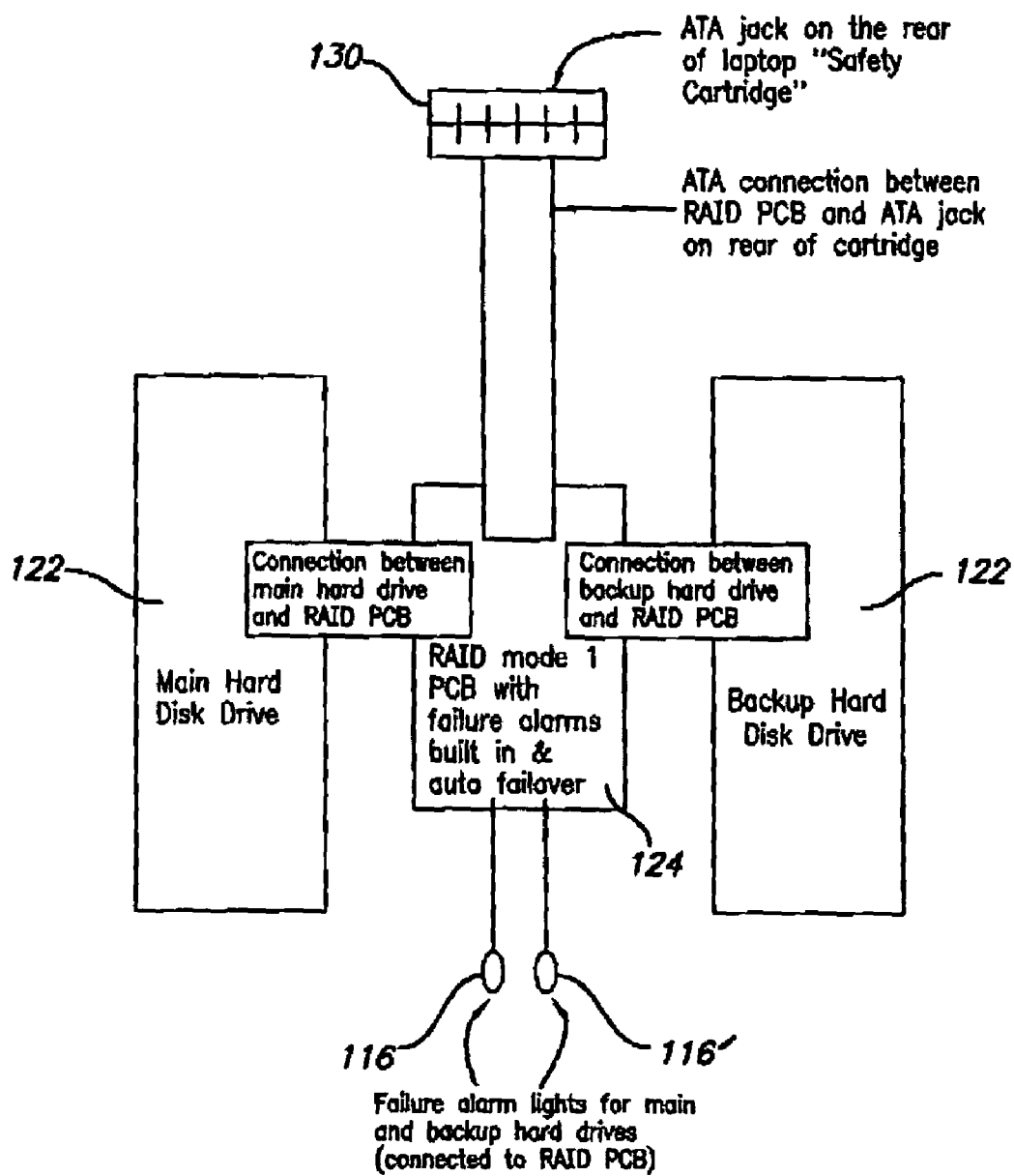
FIG. 10 is an idealized block diagram of the computer back up data storage device of the alternative embodiment of the present invention.

In FIG. 10, there is show a schematic block diagram of the safety cartridge of the present invention according to the alternative, laptop embodiment. The ATA connector 130 provides electrical power to both the main memory disk 122, the back up disk 122' and the PCB card 124 which includes the necessary read-write circuitry for the disks 122, 122' as well as the mirroring circuitry and the drivers for the alarm lights 116, 116'. The PCB 124 provides information signals through the ATA connector 130 which couples to the CPU and other circuits of the laptop computer 112.

Figure 11:
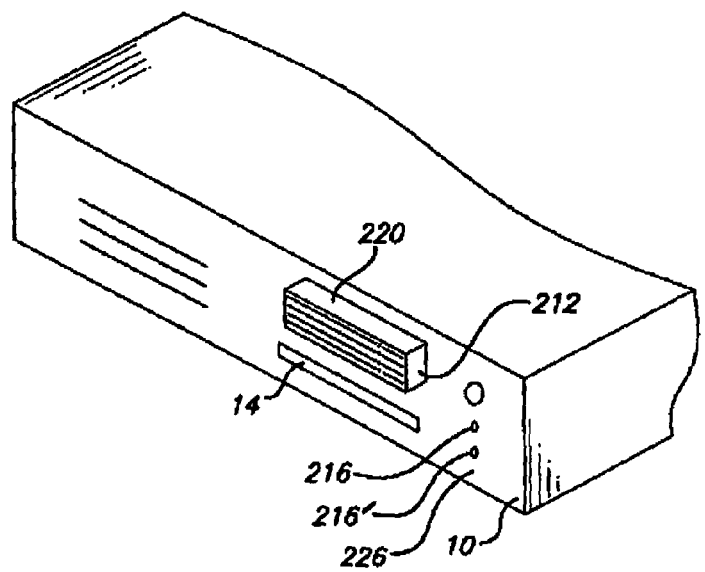
FIG. 11 is partially broken away perspective of a computer device front panel in which another alternative embodiment of the present invention is installed.
Figure 13:
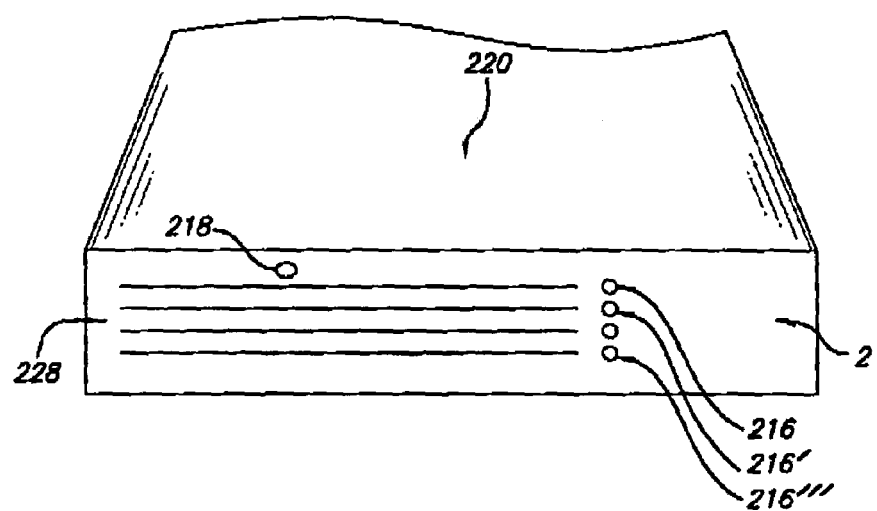
FIG. 13 is a perspective front view of the module of FIG. 12.

In FIG. 11, there is shown a desktop computer 10 with safety cartridge 212 installed and partly protruding. As with most conventional computers, a disk drive bay 14 is provided for removable storage media such a floppy disks or even Zip® disks. Failure indicators 216, 216' are located on the front panel 226 of the safety cartridge 212 to signal faults in either of the storage devices contained within the cartridge 212. In some embodiments, a pushbutton switch 218 (as seen in FIG. 13) can be used to activate the backup device in case the main one fails, but in preferred embodiments, the switch over would be automatic.

Figure 12:
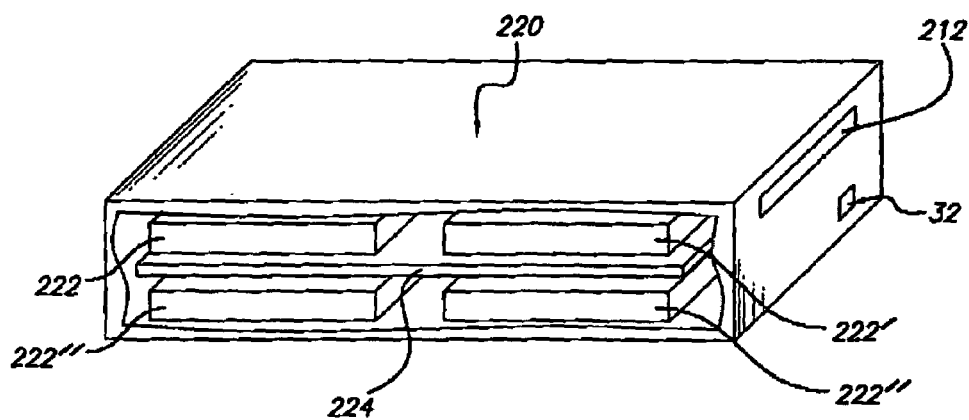
FIG. 12 is a partially cutaway side view of a removable magnetic disk module according to the alternative embodiment of FIG. 11.

Turning next to FIG. 12, there is shown a broken away side view of a safety cartridge 212, according to another embodiment of the invention. The safety cartridge 212 has a casing 220 that is adapted to fit into a "full height" opening on a conventional desk top computer case. A mounting frame (not shown) is mounted in the full height opening and is adapted to receive the safety cartridge 212.

Mounted within the casing 220 are four magnetic disks 222, 222', 222", 222''' which, in the illustrated embodiment, are substantially identical, large capacity memory devices in the "half height" configuration. Between the disks 222, 222" and disks 222', 222''' is a printed circuit board 224 with all of the ancillary circuitry necessary to allow the disks to function as a RAID Mode 1 device with mirroring (disk 222), six hour delayed mirror (disk 222") and a 24 hour delayed mirror (disk 222"). The safety cartridge 212 front panel 226 is shown in FIG. 13. As shown, a plurality of vents 228 in the front panel 226 provide air circulation for the disk drives 222, 222', 222", 222''' of FIG. 12. As also shown in FIG. 11, four lights 216, 216', 216", 216''' are placed on the front panel 226.

Figure 14:
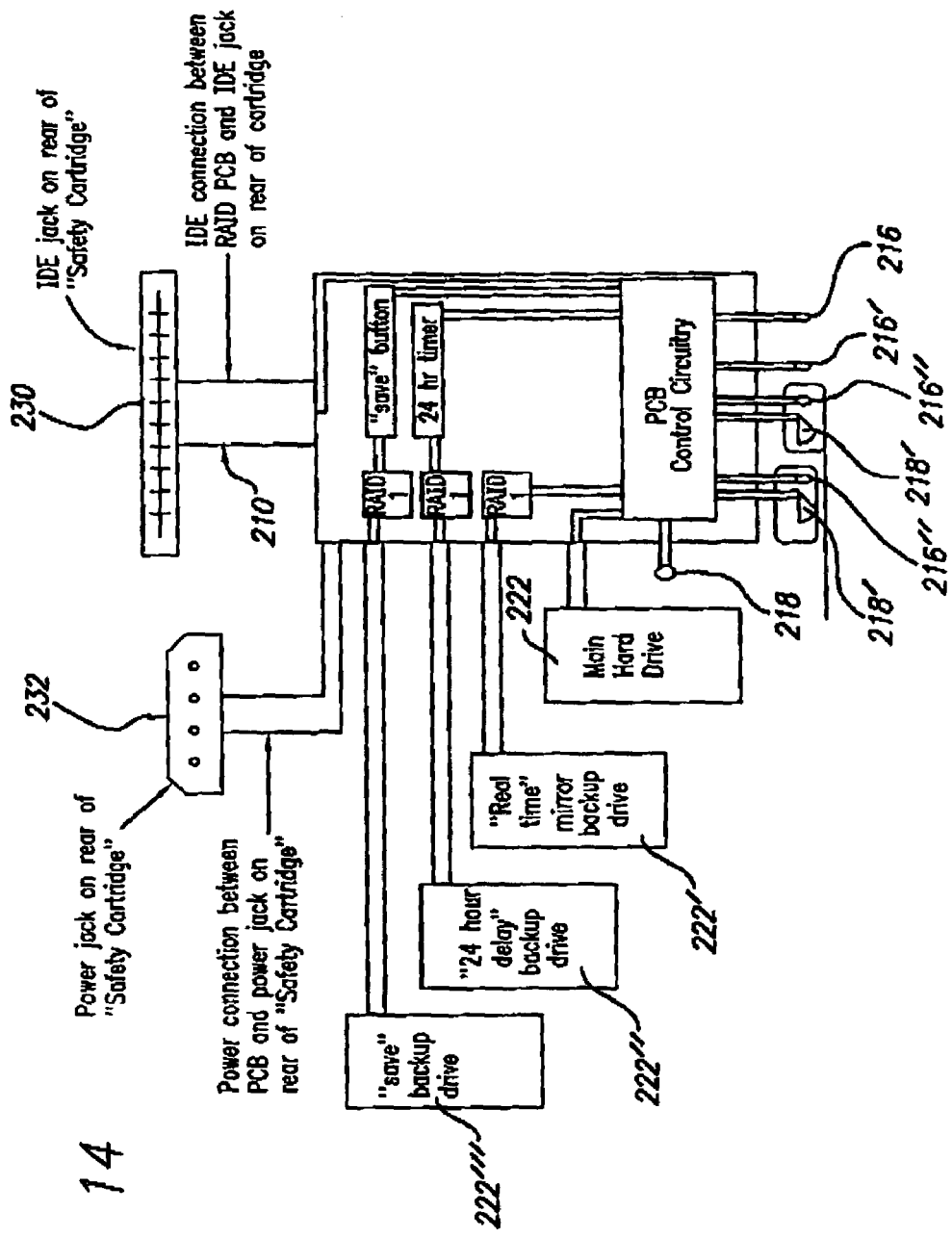
FIG. 14 is an idealized block diagram of the computer back up data storage device of the alternative embodiment of FIGS. 12 and 13.

In FIG. 14, there is shown a schematic block diagram of the safety cartridge of the present invention according to the alternative embodiment of FIG. 11. A power socket 232 provides electrical power to all of the memory disks 222, 222', 222", 222'". The PCB card 224 includes the necessary read-write circuitry for the disks 222, 222', 222", 222'" as well as the mirroring circuitry and the drivers for the alarm lights 216, 216', 216", 216'". The PCB 224 is also coupled to an IDE socket 230 that is adapted to connect to the CPU and other circuits of the computer 210.

Figure 15:
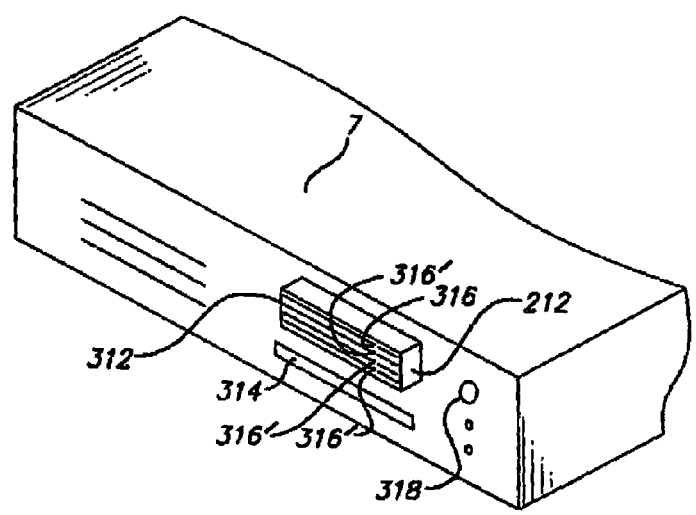
FIG. 15 is partially broken away perspective of a computer device front panel in which yet another alternative embodiment of the present invention is installed.

Turning next to FIG. 15, there is shown yet another desktop computer 310 with safety cartridge 312 according to another alternative embodiment of the invention that is installed and partly protruding. A disk drive bay 314 is provided for removable storage media such as floppy disks or even Zip® disks. Failure indicators 316, 316', 316", 316'" are located on the front panel of the safety cartridge 312 to signal faults in any of the storage devices contained within the cartridge 312. In some embodiments, a pushbutton switch 318 can be used to activate the backup device in case the main one fails, but in the preferred embodiments, the switch over would be automatic.

Figure 16:
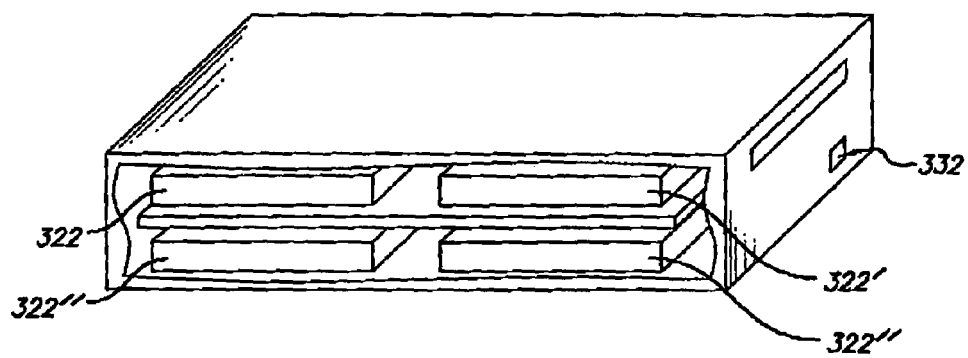
FIG. 16 is a partially cutaway side view of a removable magnetic disk module according to the alternative embodiment of FIG. 15.

Turning next to FIG. 16, there is shown a broken away side view of a safety cartridge 312, according to another embodiment of the invention. The safety cartridge 312 has a casing 320 that is adapted to fit into a "full height" opening in the conventional desk top computer case. A mounting frame (not shown) is mounted in the full height opening and is adapted to receive the safety cartridge 312.

Mounted within the casing 320 are four magnetic disks 322, 322', 322", 322'" which, in this alternative embodiment, are substantially identical, large capacity memory devices in the "half height" configuration. Between the disks 322, 322', and disks 322", 322'" is a printed circuit board 324 with all of the ancillary circuitry necessary to allow the disks to function as a RAID Mode 1 device with real time mirroring (disk 322), a 6 hour delayed mirror (disk 322") and a 24 hour delayed mirror (disk 322'").

Figure 17:
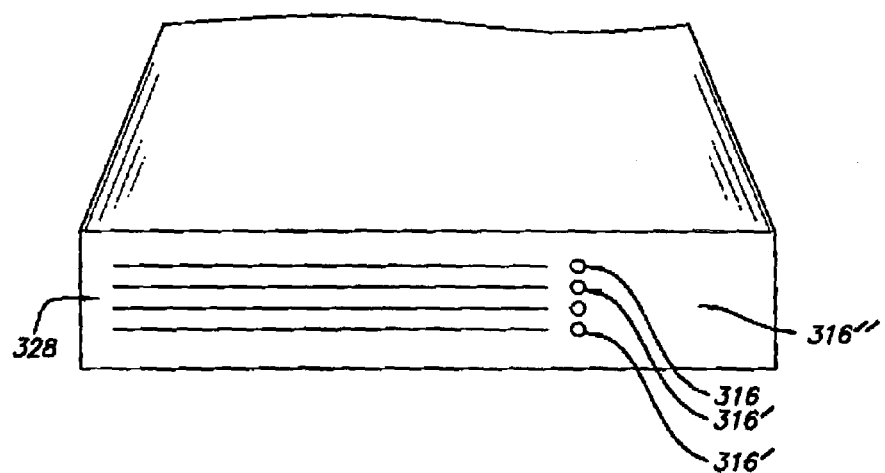
FIG. 17 is a perspective view of the module of FIG. 16 but with the front panel in place.

The safety cartridge 312 face plate 326 is shown in FIG. 17. As shown, vents 328 in the face plate 326 provide air circulation for all of the disk drives 322, 322', 322", 322'" of FIG. 15. As also shown in FIG. 15, a set of lights 316, 316' 316", 316'" are placed on the face plate 326 to signal disk failures. Unlike the other embodiments, the lights 316", 316'" are part of push button switches which, when actuated, switch to the indicated disk 322", 322'", respectively.

Figure 18:
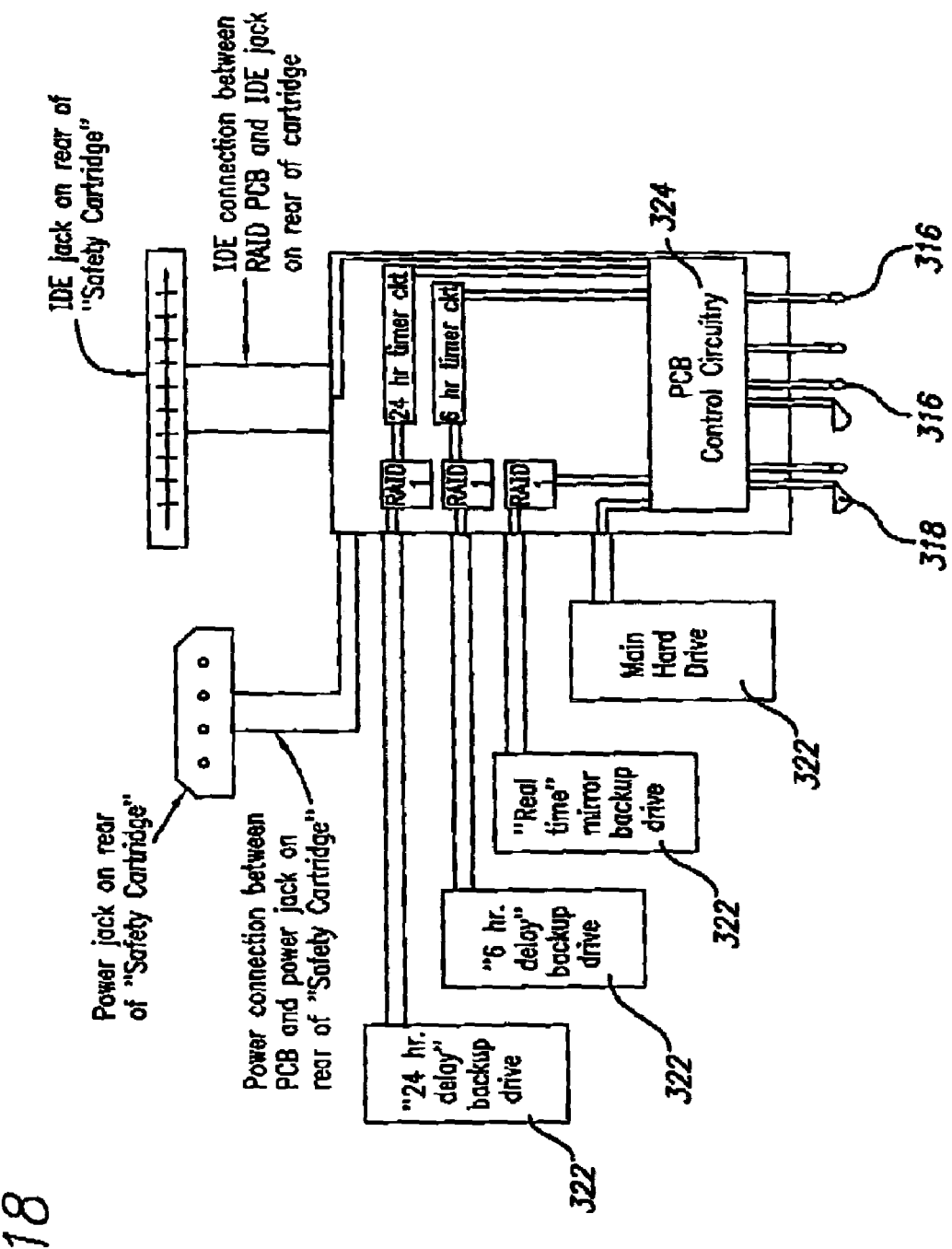
FIG. 18 is an idealized block diagram of the computer back up data storage device of the alternative embodiment of FIG. 16.

In FIG. 18, there is shown a schematic block diagram of the safety cartridge of the present invention according to the embodiment of FIG. 15. A power socket 332 provides electrical power to all of the main memory disks 322, 322', 322", 322'". The PCB card 324 includes the necessary read-write circuitry for the disks 322, 322', 322", 322'" as well as the mirroring circuitry and the drivers for the alarm lights 316, 316', 316", 316'". The PCB 324 is also coupled to the IDE socket 330 that is adapted to connect to the CPU and other circuits of the computer 310.

Accordingly, a secondary storage device for a digital computer system has been described. The description of the present invention has been made with respect to specific arrangements and constructions of the preferred embodiment. It will be apparent to those skilled in the art that the foregoing description is for illustrative purposes only, and that various changes and modifications can be made to the present invention without departing from the overall spirit and scope of the present invention. The full extent of the present invention is defined and limited only by the following claims.

What is claimed is:

1. A secondary storage device for a digital computer, comprising:
    a housing;
    attachment means coupled to an outside surface of said housing, said attachment means allowing said housing to be easily attached to the digital computer;
    a primary disk drive disposed within said housing;
    a first back-up disk drive disposed within said housing;
    at least one secondary back-up disk drive disposed within said housing;
    mirror circuitry disposed within said housing, and coupled to said primary disk drive, said first back-up disk drive and said at least one secondary back-up disk drive;
    bus connection means coupled to said mirror housing for connecting said secondary storage device to main bus of the digital computer; and
    timing means coupled to said mirror circuitry, wherein said mirror circuitry and said timing means operate to create a mirror back-up image of said primary disk drive on said first back-up disk drive in real time and mirror back-up images of said primary disk drive on said at least one secondary back-up disk drive at least one pre-determined interval.

2. The device of claim 1 further comprising power supply means coupled to said primary disk drive, said first back-up disk drive, said at least one secondary back-up disk drive, said mirror circuitry, and said timing means.

3. The device of claim 2 wherein said bus connection means comprises an IDE jack.

4. The device of claim 1 wherein said bus connection means comprises an ATA jack.

5. The device of claim 1 wherein said first back-up disk drive and said at least one secondary back-up disk drive comprise a single physical disk drive divided into a plurality of logical partitions.

6. The device of claim 1 wherein said pre-determined interval is 24 hours.

7. The device of claim 1 wherein said housing has a size sufficient to permit said storage device to fit within a laptop computer.

* * * * *